United States Patent
Zheng et al.

(10) Patent No.: US 8,059,433 B2
(45) Date of Patent: Nov. 15, 2011

(54) POWER CIRCUIT AND LIQUID CRYSTAL DISPLAY USING SAME

(75) Inventors: Jie-Jian Zheng, Shenzhen (CN); Tong Zhou, Shenzhen (CN)

(73) Assignees: Innocom Technology (Shenzhen) Co., Ltd., Shenzhen, Guangdong Province (CN); Chimei Innolux Corporation, Miao-Li County (TW)

( * ) Notice: Subject to any disclaimer, the term of this patent is extended or adjusted under 35 U.S.C. 154(b) by 654 days.

(21) Appl. No.: 12/286,309

(22) Filed: Sep. 29, 2008

(65) Prior Publication Data
US 2009/0085906 A1   Apr. 2, 2009

(30) Foreign Application Priority Data
Sep. 28, 2007   (CN) .......................... 2007 1 0077395

(51) Int. Cl.
*H02M 5/42*   (2006.01)
(52) U.S. Cl. .......................... 363/89; 363/90
(58) Field of Classification Search ............... 363/21.11, 363/21.07, 21.05, 95, 97, 49, 98, 99
See application file for complete search history.

(56) References Cited

U.S. PATENT DOCUMENTS

| | | | |
|---|---|---|---|
| 5,917,716 A | 6/1999 | Cho | |
| 6,108,222 A * | 8/2000 | Liang | 363/48 |
| 6,600,670 B2 * | 7/2003 | Morita et al. | 363/89 |
| 6,839,247 B1 * | 1/2005 | Yang et al. | 363/21.11 |
| 7,729,135 B1 * | 6/2010 | Schimel | 363/21.01 |
| 7,869,227 B2 * | 1/2011 | Lee et al. | 363/20 |
| 2006/0056210 A1 * | 3/2006 | Yamada et al. | 363/63 |
| 2007/0025125 A1 * | 2/2007 | Nakahori et al. | 363/56.02 |
| 2007/0171682 A1 * | 7/2007 | Yang et al. | 363/20 |

* cited by examiner

*Primary Examiner* — Adolf Berhane
*Assistant Examiner* — Nguyen Tran
(74) *Attorney, Agent, or Firm* — Altis Law Group, Inc.

(57) ABSTRACT

An exemplary power circuit includes a first rectifying and filtering circuit, a power factor correction (PFC) circuit, an inverter circuit and a second rectifying and filtering circuit. The first rectifying and filtering circuit receives an AC voltage and transforms the AC voltage to a first DC voltage. The power factor correction circuit includes a first transformer, a first diode and a first storage capacitor. The inverter circuit includes a transistor and a second transformer. A primary winding of the second transformer is grounded via the transistor and receives the first DC voltage via a primary winding of the first transformer, the first diode and a secondary winding of the first transformer in series when the transistor is switched on. The second rectifying and filtering circuit connected to a secondary winding of the second transformer for providing a second DC voltage to a load circuit.

15 Claims, 3 Drawing Sheets

POWER CIRCUIT AND LIQUID CRYSTAL DISPLAY USING SAME

FIELD OF THE INVENTION

The present disclosure relates to power circuit, and more particularly to a power circuit employing a power factor correction (PFC) circuit and a liquid crystal display (LCD) using the same.

GENERAL BACKGROUND

Liquid crystal displays (LCDs) have been widely used in various portable information products such as notebooks, personal digital assistants (PDAs), and video cameras, because of its portability, low power consumption, and low radiation. A typical LCD includes an LCD panel, a backlight for illuminating the LCD panel, a backlight control circuit for controlling the backlight, and a power circuit for providing operation voltages to the LCD panel and the backlight control circuit.

Referring to FIG. 3, one such power circuit 10 includes a first rectifying and filtering circuit 11, a PFC circuit 12, a protection circuit 13, an inverter circuit 14 and a second rectifying and filtering circuit 15.

The first rectifying and filtering circuit 11 includes two inputs 111, 112 configured to receive an external alternating current (AC) voltage, such as a 220V AC voltage, a full-bridge rectifying circuit 110 configured to convert the 220V AC voltage to a first direct current (DC) voltage, a filter capacitor 114 configured to stabilize the first DC voltage, and a first output 113 configured to output the first DC voltage. Two inputs of the full-bridge rectifying circuit 110 serve as the two inputs 111, 112. A positive output of the full-bridge rectifying circuit 110 serves as the first output 113. A negative output of the full-bridge rectifying circuit 110 is grounded. The filter capacitor 114 is connected between the first output 113 and ground.

The PFC circuit 12 includes a first inductor 121, a first diode 122, a first transistor 123, a PFC chip 124, and a first storage capacitor 125. The PFC chip 124 includes a control terminal 1242 and a ground terminal 1244. A terminal of the first inductor 121 is connected to the first output 113. Another terminal of the first inductor 121 is connected to a drain electrode of the first transistor 123, and is connected to ground via the positive terminal of the first diode 122, the negative terminal of the first diode 122, and the storage capacitor 125 in series. A gate electrode of the first transistor 123 is connected to the control terminal 2242 of the PFC chip 1242. A source electrode of the first transistor 123 is connected to ground.

The inverter circuit 14 includes a pulse width modulation (PWM) chip 141, a second transistor 142, and a transformer 143. The PWM chip 141 includes a pulse output 1411 configured to output a pulse signal. The transformer 143 includes a primary winding 1431 and a secondary winding 1432.

The pulse output 1411 is connected to a gate electrode of the second transistor 142 for switching on or switching off the second transistor 142. A terminal of the primary winding 1431 is connected to the negative terminal of the first diode 122. Another terminal of the primary winding 1431 is connected to ground via a drain electrode and a source electrode of the second transistor 142. The secondary winding 1432 is connected to the second rectifying and filtering circuit 15.

The second rectifying and filtering circuit 15 includes a second inductor 151, a second diode 152, a second storage capacitor 153, a second filter capacitor 154, and a voltage output 155. A terminal of the secondary winding 2432 is connected to a negative terminal of the second diode 152. The other terminal of the secondary winding 1432 is connected to ground via the second storage capacitor 153, and is connected to the voltage output 155 via the second inductor 151. The second filter capacitor 154 is connected between the voltage output 155 and ground. A positive terminal of the second diode 152 is grounded. The second filter capacitor 154 is connected between the voltage output 155 and ground.

The external AC voltage $U_1$ is provided to the two inputs 111, 112 of the first rectifying and filtering circuit 11. The external AC voltage $U_1$ is a sine wave voltage and a current $I_1$ between the two inputs 111, 112 is a triangle wave current. The external AC voltage $U_1$ is transformed into the first DC voltage $U_2$ and is provided to the PFC circuit 12. The first DC voltage $U_2$ is a pulse wave and a current $I_2$ thereof is a triangle wave current.

The PFC circuit 12 is configured to adjust the triangle wave current $I_2$ to be similar to the waveform of the first DC voltage $U_2$, and synchronize phases of the first DC voltage $U_2$ and the corresponding current $I_2$. When the first transistor 123 is switched on in a first period $t_1$, the first DC voltage $U_2$ is grounded via the first inductor 121. Thus a gradually increased current $I_3$ is generated in phase with the first DC voltage $U_2$. When the first transistor 123 is switched off in a second period $t_2$, a gradually decreased current $I_3$ is generated in phase with the first DC voltage $U_2$. The first storage capacitor 125 is charged via the current $I_3$ via the first diode 124 in order to stabilize the first DC voltage $U_2$.

The first DC voltage $U_2$ is then provided to the primary winding 141. The PWM chip 141 generates the pulse signal for switching on or switching off the transistor 142. When the transistor 142 is switched on, a gradually increased current flows through the primary winding 1431 when the first DC voltage $U_2$ is connected to ground via the primary winding 1431 and the second transistor 142. When the transistor 142 is switched off, the energy stored in the primary winding 1431 is discharged via the protection circuit 13. Thus current flowing through the primary winding 1431 is gradually decreased.

The secondary winding 1432 induces the current flowing through the primary winding 1431 and generates a second AC voltage across the secondary winding 1432. The second rectifying and filtering circuit 15 transforms the second AC voltage into a second DC voltage and provides the second DC voltage to a load circuit (not shown) via the voltage output 155.

However, the power circuit 10 includes both the PWM chip 141 and the PFC chip 124. Because operation frequencies of the PWM chip 141 and the PFC chip 124 are different and respectively fixed, an interference is generated between the two chips. Therefore, noise of the power circuit 10 is generated by the interference.

It is desired to provide a new power circuit which can overcome the above-described deficiency.

SUMMARY

A power circuit includes a first rectifying and filtering circuit, a power factor correction circuit, an inverter circuit and a second rectifying and filtering circuit. The first rectifying and filtering circuit receives an AC voltage and transforms the AC voltage to a first DC voltage. The power factor correction circuit includes a first transformer, a first diode and a first storage capacitor. The first transformer includes a primary winding and a secondary winding. The inverter circuit includes a transistor and a second transformer. The second transformer includes a primary winding and a secondary winding. The primary winding of the second transformer is grounded via the transistor and receives the first DC voltage via the primary winding of the first transformer, the first diode and the secondary winding of the first transformer in series when the transistor is switched on. The second rectifying and filtering circuit connected to the secondary winding of the second transformer for providing a second DC voltage to a load circuit.

Other novel features and advantages will become more apparent from the following detailed description when taken in conjunction with the accompanying drawings.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Reference will now be made to the drawings to describe various embodiments of the present disclosure in detail.

Figure 1:
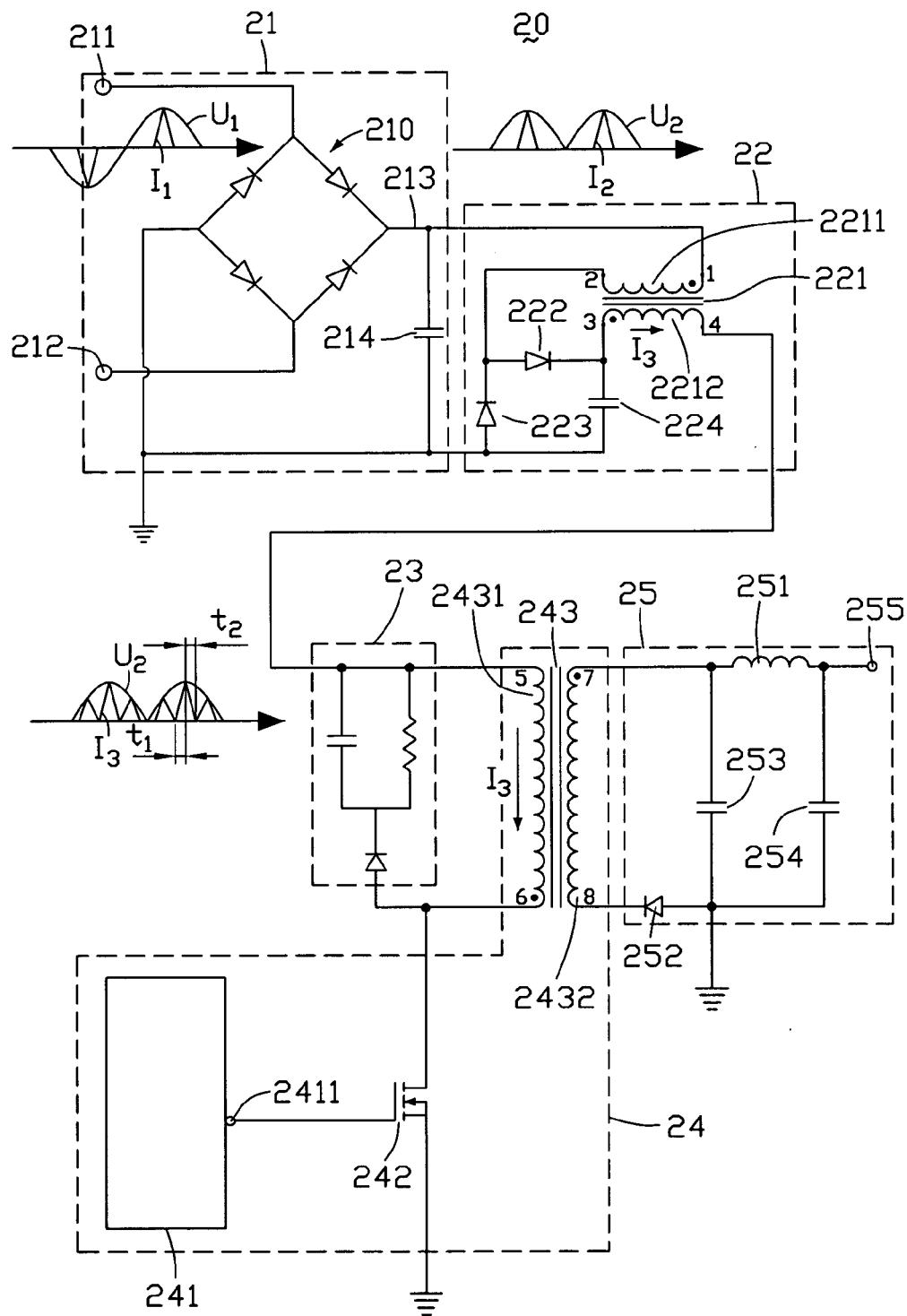
FIG. 1 is a circuit diagram of one embodiment of a power circuit of the present disclosure.
Figure 2:
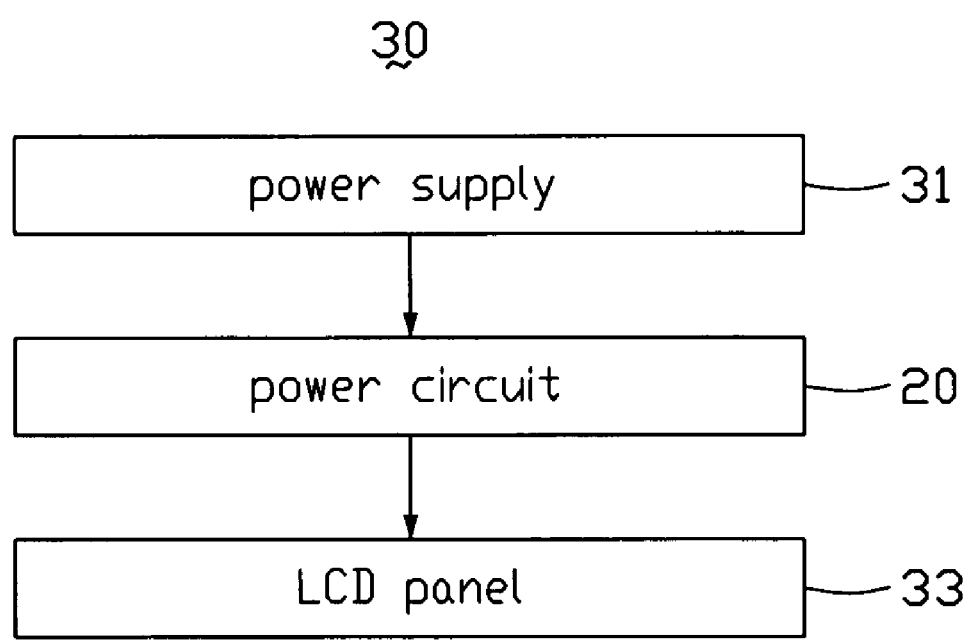
FIG. 2 is a diagram of one embodiment of an LCD employing the power circuit of FIG. 1.

Referring to FIG. 1, one embodiment of a power circuit 20 includes a first rectifying and filtering circuit 21, a PFC circuit 22, a protection circuit 23, an inverter circuit 24, and a second rectifying and filtering circuit 25.

The first rectifying and filtering circuit 21 includes two inputs 211, 212 configured to receive an AC voltage, such as a 220V AC voltage, a full-bridge rectifying circuit 210 configured to convert the 220V AC voltage to a first DC voltage, a filter capacitor 214 configured to stabilize the first DC voltage, and a first output 213 configured to provide the first DC voltage. Two inputs of the full-bridge rectifying circuit 210 serve as the two inputs 211, 212. A positive output of the full-bridge rectifying circuit 210 serves as the first output 213. A negative output of the full-bridge rectifying circuit 210 is grounded. The filter capacitor 214 is connected between the first output 213 and ground.

In one embodiment, the PFC circuit 22 includes a first transformer 221, a first diode 222, a second diode 223, and a first storage capacitor 224. The first transformer 221 includes a primary winding 2211 and a secondary winding 2212. The primary winding 2211 includes a first terminal "1" and a second terminal "2. The secondary winding 2212 includes a third terminal "3" and a fourth terminal "4.

The first terminal "1" is connected to the first output 213. The second terminal "2" is connected to a positive terminal of the first diode 222 and a negative terminal of the second diode 223. A negative terminal of the first diode 222 is connected to ground via the first storage capacitor 224, and is connected to the third terminal "3. A positive terminal of the second diode 223 is grounded.

In one embodiment, the inverter circuit 24 includes a PWM chip 241, a transistor 242, and a second transformer 243. The PWM chip 241 includes a pulse output 2411 configured to output pulse signals. The second transformer 243 includes a primary winding 2431 and a secondary winding 2432. The primary winding 2431 of the second transformer 243 includes a fifth terminal "5" and a sixth terminal "6." The secondary winding 2432 of the second transformer 243 includes a seventh terminal "7" and an eighth terminal "8. The transistor 242 is an n-channel metal-oxide-semiconductor field-effect transistor (N-MOSFET).

The pulse output 2411 of the PWM chip 241 is connected to a gate electrode of the transistor 242 for switching on or switching off the transistor 242. The terminal "5" is connected to the terminal "4 The terminal "6" is connected to ground via a drain electrode and a source electrode of the transistor 242 in series.

The protection circuit 23 is connected in parallel with the primary winding 2431 of the secondary transformer 243.

In one embodiment, the second rectifying and filtering circuit 25 includes an inductor 251, a third diode 252, a second storage capacitor 253, a second filter capacitor 254, and a voltage output 255. The terminal "8" is connected to a negative terminal of the third diode 252. The terminal "7" is connected to ground via the second storage capacitor 253, and is connected to the voltage output 255 via the inductor 251. The second filter capacitor 254 is connected between the voltage output 255 and ground. A positive terminal of the third diode 252 is grounded.

The external AC voltage $U_1$ is provided to the two inputs 211, 212 of the first rectifying and filtering circuit 21. The external AC voltage $U_1$ may a sine wave voltage, in one embodiment, and a first current $I_1$ between the two inputs 211, 212 is a triangle wave current. The external AC voltage $U_1$ is transformed into the first DC voltage $U_2$ and is provided to the PFC circuit 22. The first DC voltage $U_2$ is a pulse wave and a corresponding second current $I_2$ thereof is a triangle wave current.

The PFC circuit 22 is configured to adjust the wave of the second current $I_2$ to be similar to the wave of the first DC voltage $U_2$, and synchronize phases of the first DC voltage $U_2$ and the corresponding second current $I_2$.

The PWM chip 241 generates the pulse signals for switching on or switching off the transistor 242. When the transistor 242 is switched on in a first period ti, the primary winding 2211 of the first transformer 221 is connected to ground via the first diode 222, the secondary winding 2212 of the first transformer 221, the primary winding 2431 of the second transformer 243, the transistor 242 in series. Thus, a gradually increased third current $I_3$ is generated in a direction from terminal "3" to terminal "4" when the first DC voltage $U_2$ at the first output 213 is grounded. The third current 13 also flows through the primary winding 2431 of the second transformer 243.

When the transistor 242 is switched off in a second period $t_2$, the energy stored in the primary winding 2431 is discharged through the protection circuit 23. Thus, the third current $I_3$ is gradually decreased and the primary winding 2211 induces the third current $I_3$ flowing through the secondary winding 2212 to generate an induction voltage across the primary winding 2211. Therefore, a voltage of the terminal "1" is higher than that of the terminal "2" and the first filter capacitor 214 is charged via a closed current path which is formed by the primary winding 2211, the first filter capacitor 214, and the second diode 223. The first storage capacitor 223 can be charged via the first filter capacitor 214 when the transistor 242 is switched on again.

The secondary winding 2432 induces the third current $I_3$ flowing through the primary winding 2431, and generates a second AC voltage across the secondary winding 2432. The second rectifying and filtering circuit 25 transforms the second AC voltage into a second DC voltage and provides the second DC voltage to a load circuit (not shown) via the voltage output 255. The second storage capacitor 253 is configured to stabilize the second DC voltage.

Because the PFC circuit 22 includes the first transformer 221 and the first diode 222, it can realize a function of power factor correction according to the operation of the transistor 242. Thus, a voltage across the primary winding 2431 of the second transformer 243 synchronizes with a current flowing therethrough and the waves of the voltage across the primary winding 2431 and the corresponding current flowing therethrough are substantially similar. When the parameters of the first transformer 221, the first diode 222 and the first storage capacitor 224 are set to match with an operation frequency of the PWM chip, noise of the power circuit 20 can be substantially eliminated or depressed.

Furthermore, cost of the PFC circuit 22 including the first transformer 221 and the first diode 222 is less than a typical PFC circuit including the PFC chip. Thus, the cost of the power circuit 20 is correspondingly reduced.

Figure 3:
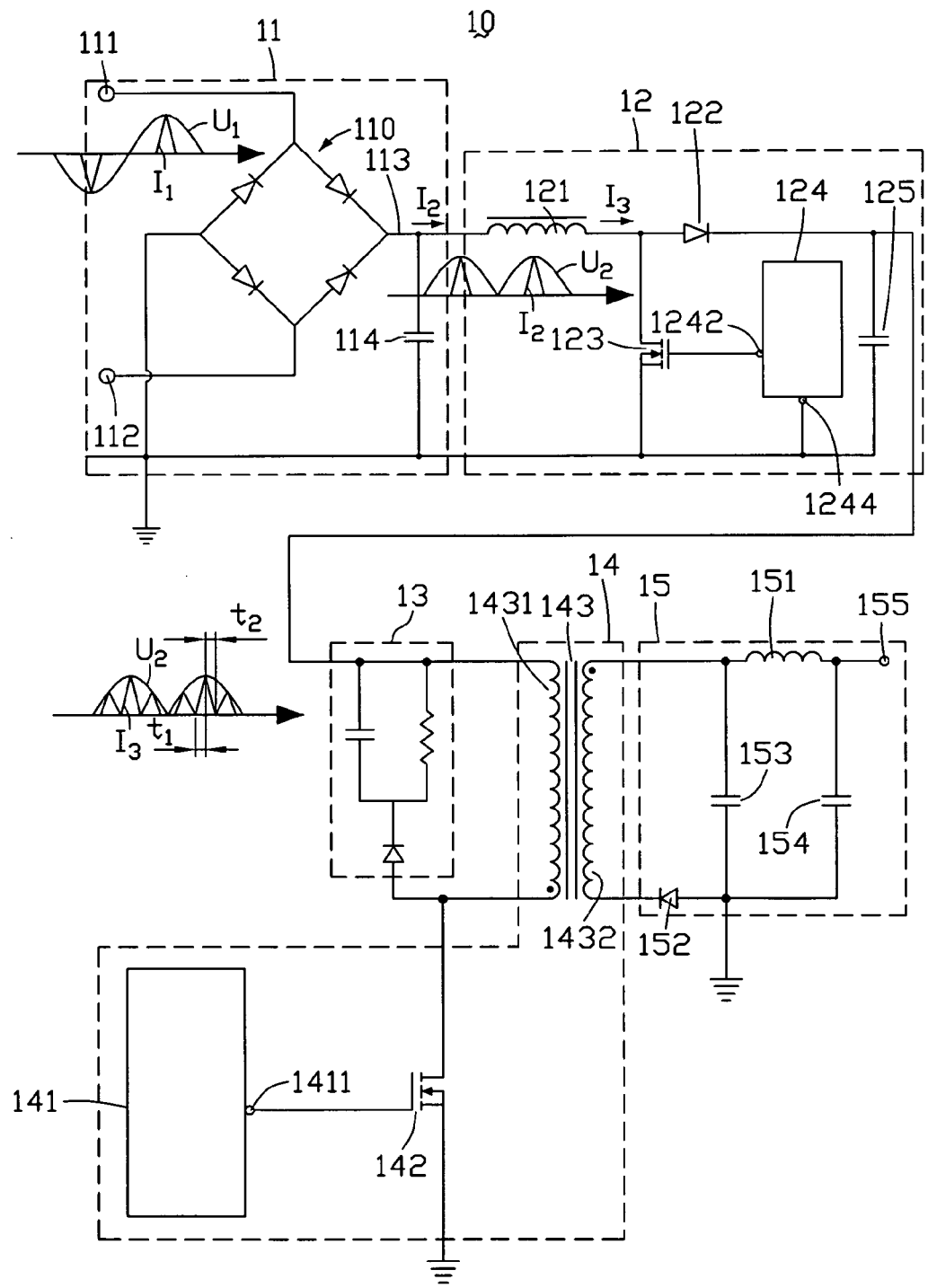
FIG. 3 is a diagram of a typical power circuit employed in an LCD.

Referring to FIG. 3, one embodiment of an LCD employing the power circuit 20 is shown. The LCD 30 includes a power supply 31, the power circuit 20, and an LCD panel 33. The power supply 31 provides an AC voltage to the power circuit 20. The power circuit 20 transforms the AC voltage to at least one DC voltage for driving the LCD panel 33. The LCD panel 33 is configured to display an image thereon.

It is to be understood, however, that even though numerous characteristics and advantages of the present disclosure have been set out in the foregoing description, together with details of the structures and functions of the embodiments, the disclosure is illustrative only; and that changes may be made in detail, especially in matters of arrangement of parts within the principles of the present disclosure to the full extent indicated by the broad general meaning of the terms in which the appended claims are expressed.

What is claimed is:

1. A power circuit comprising:
   a first rectifying and filtering circuit configured to receive an alternating current (AC) voltage and transform the AC voltage to a first DC voltage, the first rectifying and filtering circuit comprising a first output configured to output the first DC voltage and a first filter capacitor directly connected between the first output and ground;
   a power factor correction (PFC) circuit comprising a first transformer, a first diode, a second diode with a grounded positive terminal and a first storage capacitor, the first transformer comprising a primary winding and a secondary winding;
   an inverter circuit comprising a transistor and a second transformer, the second transformer comprising a primary winding and a secondary winding, the primary winding of the second transformer being grounded via the transistor and configured to receive the first DC voltage via the primary winding of the first transformer, the first diode, and the secondary winding of the first transformer in series when the transistor is switched on; and
   a second rectifying and filtering circuit connected to the secondary winding of the second transformer for providing a second DC voltage to a load circuit;
   wherein the first filter capacitor is charged via a current path formed by the primary winding of the first transformer, the second diode, and the first filter capacitor when the transistor is switched off.

2. A power circuit comprising:
   a first rectifying and filtering circuit configured to receive an alternating current (AC) voltage and transform the AC voltage to a first DC voltage, the first rectifying and filtering circuit comprising a first output configured to output the first DC voltage and a first filter capacitor connected between the first output and ground;
   a power factor correction (PFC) circuit comprising a first transformer, a first diode, a second diode and a first storage capacitor, the first transformer comprising a primary winding and a secondary winding;
   an inverter circuit comprising a transistor and a second transformer, the second transformer comprising a primary winding and a secondary winding, the primary winding of the second transformer being grounded via the transistor and configured to receive the first DC voltage via the primary winding of the first transformer, the first diode, and the secondary winding of the first transformer in series when the transistor is switched on; and
   a second rectifying and filtering circuit connected to the secondary winding of the second transformer for providing a second DC voltage to a load circuit,
   wherein the first filter capacitor is charged via a current path formed by the primary winding of the first transformer, the second diode, and the first filter capacitor when the transistor is switched off;
   wherein the primary winding of the first transformer comprises a first terminal and a second terminal, wherein the first terminal of the first transformer is connected to the first output, the second terminal of the primary winding of the first transformer is connected to a positive terminal of the first diode and a negative terminal of the second diode, a positive terminal of the second diode is grounded, a negative terminal of the first diode is grounded via the secondary winding of the first transformer, the primary winding of the second transformer, and the transistor in series.

3. The power circuit of claim 2, the inverter circuit further comprises a pulse width modulation (PWM) chip configured to switch on or switch off the transistor.

4. The power circuit of claim 3, wherein the PWM chip comprises a pulse output connected to a gate electrode of the transistor.

5. The power circuit of claim 3, wherein the inverter circuit further comprises a protection circuit connected in parallel with the primary winding of the second transformer.

6. The power circuit of claim 2, wherein the second rectifying and filtering circuit comprises an inductor, a third diode, a second storage capacitor, and a voltage output, wherein the secondary winding of the second transformer comprises a first terminal and a second terminal, the first terminal of the secondary winding of the second transformer is connected to a negative terminal of the third diode, the second terminal of the secondary winding of the second transformer is connected to ground via the second storage capacitor, and is connected to the voltage output via the inductor, a positive terminal of the third diode is grounded.

7. The power circuit of claim 6, wherein second rectifying and filtering circuit further comprises a second filter capacitor connected between the voltage output and ground.

8. The power circuit of claim 2, wherein transistor is an n-channel metal-oxide-semiconductor field-effect transistor.

9. A liquid crystal display (LCD) comprising an LCD panel and a power circuit, the power circuit comprising a power supply for providing an alternating current (AC) voltage and a first rectifying and filtering circuit for providing a first DC voltage, a PFC circuit, an inverter circuit, and a second rectifying and filtering circuit, the PFC circuit comprising a first transformer, the inverter circuit comprising a second transformer and a transistor, wherein the PFC circuit realizes a power factor correction of the first DC voltage according to the operation of the transistor and the PFC circuit, wherein a primary winding of the first transformer comprises a first terminal and a second terminal, wherein the first terminal of the primary winding of the first transformer is configured to receiving the first DC voltage, the second terminal of the primary winding of the first transformer is connected to a positive terminal of a first diode and a negative terminal of a second diode, a positive terminal of the second diode is grounded, a negative terminal of the first diode is grounded via a secondary winding of the first transformer, the primary winding of the second transformer, and the transistor in series.

10. The LCD of claim 9, the inverter circuit further comprises a pulse width modulation (PWM) chip configured to switch on and switch off the transistor.

11. The LCD of claim 10, wherein the PWM chip comprises a pulse output connected to a gate electrode of the transistor.

12. The LCD of claim 11, wherein the inverter circuit further comprises a protection circuit connected in parallel with the primary winding of the second transformer.

13. The LCD of claim 9, wherein the second rectifying and filtering circuit comprises an inductor, a third diode, a second storage capacitor, and a voltage output, wherein a secondary winding of the second transformer comprises a first terminal and a second terminal, the first terminal of the secondary winding of the second transformer is connected to a negative terminal of the third diode, the second terminal of the secondary winding of the second transformer is connected to ground via the second storage capacitor, and is connected to the voltage output via the inductor, a positive terminal of the third diode is grounded.

14. The LCD of claim 9, wherein a negative terminal of the first diode is grounded via the first storage capacitor.

15. The LCD of claim 1, wherein a negative terminal of the first diode is grounded via the first storage capacitor.

* * * * *